(12) United States Patent
Fukushima et al.

(10) Patent No.: US 8,199,392 B2
(45) Date of Patent: Jun. 12, 2012

(54) LIGHT-SCANNING DEVICE AND IMAGE-FORMING APPARATUS

(75) Inventors: Akira Fukushima, Yokohama (JP); Tomoya Ohsugi, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 899 days.

(21) Appl. No.: 12/010,066

(22) Filed: Jan. 18, 2008

(65) Prior Publication Data

US 2008/0259430 A1 Oct. 23, 2008

(30) Foreign Application Priority Data

Jan. 25, 2007 (JP) ................................. 2007-015073

(51) Int. Cl.
*G02B 26/08* (2006.01)
(52) U.S. Cl. .................................. 359/216.1; 359/218.1
(58) Field of Classification Search .... 359/196.1–226.2; 347/243, 259, 261
See application file for complete search history.

(56) References Cited

U.S. PATENT DOCUMENTS

| | | | |
|---|---|---|---|
| 4,796,963 A * | 1/1989 | Yoshimura | ................. 359/218.1 |
| 6,376,837 B1 | 4/2002 | Itabashi et al. | |
| 6,839,157 B2 | 1/2005 | Ono et al. | |
| 6,903,858 B2 | 6/2005 | Kaneko et al. | |
| 2003/0184836 A1 * | 10/2003 | Kaneko et al. | ................. 359/216 |
| 2004/0125192 A1 | 7/2004 | Ohsugi | |
| 2004/0184127 A1 | 9/2004 | Nakajima et al. | |
| 2005/0105156 A1 | 5/2005 | Ono et al. | |
| 2006/0187513 A1 | 8/2006 | Ohsugi | |
| 2006/0284968 A1 | 12/2006 | Hayashi et al. | |
| 2007/0216966 A1 | 9/2007 | Ohsugi | |

FOREIGN PATENT DOCUMENTS

| | | |
|---|---|---|
| JP | 62-104218 | 7/1987 |
| JP | H03-18655 | 2/1991 |
| JP | 06-337364 | 12/1994 |
| JP | 2774444 | 4/1998 |
| JP | 10-123447 | 5/1998 |
| JP | 10-221633 | 8/1998 |
| JP | 11-264950 | 9/1999 |
| JP | 2002-214552 | 7/2002 |
| JP | 2002-267990 | 9/2002 |
| JP | 2002-372680 | 12/2002 |
| JP | 2003-295094 | 10/2003 |
| JP | 2006-014429 | 1/2006 |

* cited by examiner

*Primary Examiner* — James Phan
(74) *Attorney, Agent, or Firm* — Dickstein Shapiro LLP (57) ABSTRACT

A light-scanning device includes a polygon scanner having a rotatable polygon mirror which deflects a laser beam emitted from a light source, an optical image-forming element which images the deflected laser beam on a predetermined position, and an optical housing which supports the light source, the polygon scanner and the optical image-forming element, a non-rotational cylindrical shielding member for covering an upper part of the polygon scanner.

4 Claims, 10 Drawing Sheets

STAIN

FIG. 13

LIGHT-SCANNING DEVICE AND IMAGE-FORMING APPARATUS

CROSS-REFERENCE TO THE RELATED APPLICATION

This application is based on and claims the priority benefit of Japanese Patent Application No. 2007-015073, filed on Jan. 25, 2007, the disclosure of which is incorporated herein by reference in its entirety.

BACKGROUND OF THE INVENTION

1. Field of the Invention

The present invention relates to a light-scanning device employed in complex machines such as a copying machine, a facsimile, a printer, etc. and an image-forming apparatus in which the light-scanning device is installed.

2. Description of Related Art

In an image-forming apparatus which employs an electrophotographic process known as the Carlson process, as a photoreceptor drum which is an example of an image carrier rotates, a toner image is formed on a surface of the photoreceptor drum through sequential processes of uniform electrification of the surface of the photoreceptor drum, latent image formation by light exposure, developing, transferring and fixing. In the processes, the so-called light-scanning device is used to form the latent image on the photoreceptor drum.

A general structure of the optical scanning device is explained with reference to FIG. 9. In the optical scanning device, laser light emitted from a semiconductor laser 101 is coupled by a coupling lens 105. The laser light passes through an aperture (not shown) to adjust the laser light and enters a cylindrical lens 109 being powerful only in a sub-scanning direction. The laser light emitted from the cylindrical lens 109 is imaged as a long linear image in a main scanning direction in a vicinity of a surface of a polygon mirror 111 of a polygon scanner 100 and is subjected to deflection scanning in the main scanning direction by the polygon scanner 100. The laser light which is subjected to the deflection scanning is focused via a first scanning lens 113 and a second scanning lens 121 to scan the surface of the image carrier (not shown) at an approximately constant speed.

Figure 10:
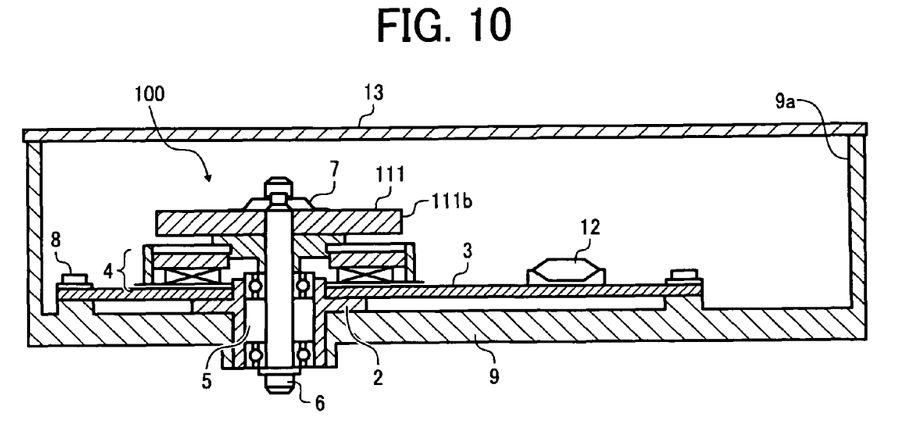
FIG. 10 is a sectional view showing main parts of a conventional light-scanning device.

As shown in FIG. 10, the polygon scanner 100 is composed of the rotatable polygon mirror 111, a motor 4 to rotate the polygon mirror 111 and a driving control circuit board 3. The motor 4 is supported by a motor bearing 5. A bearing accommodation section 2 housing the motor bearing 5 is integrated with the driving control circuit board 3 by caulking or the like. The rotatable polygon mirror 111 is fixed on a rotation shaft 6 by a fixation spring 7. The rotatable polygon mirror 111 is rotated by the rotation of the rotation shaft 6. An integrated circuit 12 for controlling the motor 4, etc. is installed on the driving control circuit board 3.

Such a polygon scanner 100 is fixedly positioned by a plurality of screws 8 in an optical housing 9. The optical housing 9 is usually made of a resin. The optical housing has at an upper portion thereof an opening 9a, which is covered by a cover 13 made of a thin metallic plate or synthetic-resinous plate, etc. A gasket (not shown) to seal up an inside of the optical housing 9 may be provided between the optical housing 9 and the cover 13.

Meanwhile, in response to the demand for an image of high-density and for high-speed printing, the rotational speed of the rotatable polygon mirror 111 has been raised up to tens of thousands rpm, which causes the following two problems. One of the problems is the noise increment caused by the wind noise. The other is the contamination of the reflecting surfaces of the rotatable polygon mirror caused by dust contained in the air.

The first problem is explained as follows. When the rotatable polygon mirror is rotated, the surrounding air is also rotated. The flow velocity of the airstream achieves its maximum at the periphery of reflecting surfaces 111b of the rotatable polygon mirror, which is the largest part in the composition of the polygon scanner. Because of this, an airstream is generated as shown by the broad arrows in FIG. 11. Because the rotatable polygon mirror has a polyhedral-shape, the airstream is obstructed by an angle of the adjoining portion of the adjacent reflecting surfaces 111b, to generate the wind noise. The frequency and the level of the wind noise rise depending on the increase in the rotational speed of the rotatable polygon mirror 111. This wind noise constitutes the majority of the noise of a conventional polygon scanner.

Figure 12:
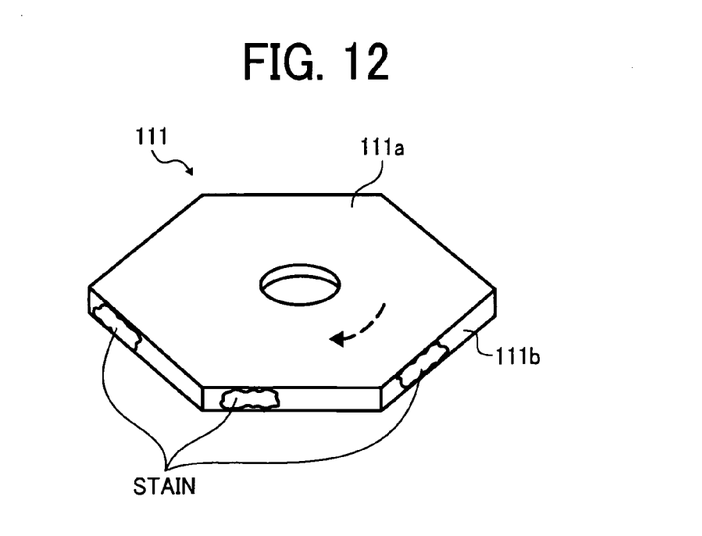
FIG. 12 is an enlarged perspective view showing a receptor wherein stains are attached to an optical reflecting surface of the rotatable polygon mirror.

With respect to the second problem, the dust contained in the air enters into the optical housing 9 from the outside thereof and is drawn into the high-speed airstream along with the rotation of the rotatable polygon mirror 111 at high speed. This dust circulates in the vicinity of the reflecting surfaces 111b of the rotatable polygon mirror and is adhered on the reflecting surfaces of the rotatable polygon mirror, as shown in FIG. 12, which causes contamination of the reflecting surfaces 111b. Consequently, the reflectivity is significantly decreased with the reduction in light quantity and light quantity irregularity occurs. In particular, this phenomenon tends to be more notable with the lapse of time.

The following two broadly divided countermeasures can be considered as solutions to the above-mentioned two problems (noise and dust). One countermeasure is to seal the polygon scanner, whereby the wind noise can be insulated from outside, so as to protect the reflection side of the polygon mirror from the dust in the air. Another countermeasure is not to seal the polygon scanner, and by providing a member for obstructing the air current generated by the rotation of the rotatable polygon mirror, the air current never hits the polygon mirror directly. Technologies for sealing a polygon scanner are disclosed, for example, in Japanese Patent Number 2774444 and Japanese Application Publication Number Hei11-264950.

Figure 13:
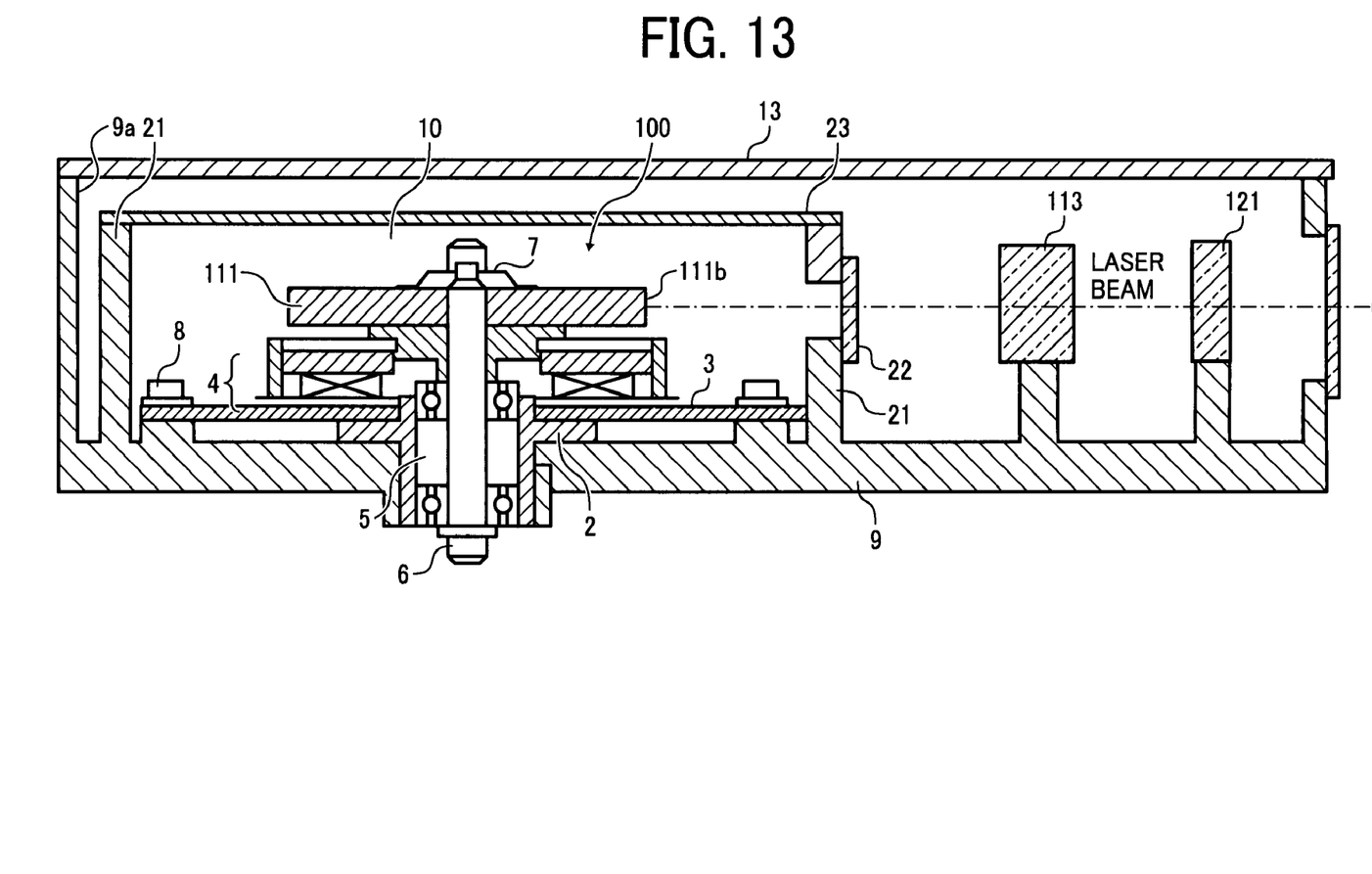
FIG. 13 is a second view showing a different configuration of the conventional light-scanning device.

When sealing the polygon mirror, the problems, as indicated in Japanese Patent Number 2774444 and Japanese Application Publication Number Hei11-264950, will be explained with reference to FIG. 13. There are provided with a sidewall 21 standing in the optical housing 9; a transmission optical element 22 forming part of the sidewall whereby the deflected laser beam is transmitted to the outside of the sidewall at the rotatable polygon mirror 111; and a plate-like cover 23 fixed at the top edge of the sidewall thereby separating the space formed by the sidewalls for seclusion. The sealed polygon chamber 10 is formed by surrounding the polygon scanner 100.

When the polygon chamber 10 is sealed, there may arise the following problems. One of the problems is that the calorific value of the integrated circuit caused by the electric current that flows in an integrated circuit 12 on a driving circuit control substrate 3 of the polygon scanner 111 increases because the polygon chamber 10 has been sealed. Another problem lies in the act that when the calorific value from the rotational driving part such as the motor 4 increases, the temperature of the inside of the sealed up polygon chamber 10 rises remarkably. Due to the temperature rise, the service lives of both the integrated circuit 12 and the motor bearing 5 (rotational driving part) are shortened and the evaporated film of the reflecting surfaces of the rotatable polygon mirror 111 is oxidized and peels off.

In addition, there occurs an abnormality in the image resulting from the deviation of the image-forming position caused by a different reflection direction of the laser beam because when the temperature rises, the bottom of the housing in the polygon chamber 10 transforms and the rotation shaft 6 of the rotatable polygon mirror 111 tilts (the tilt of the shaft).

In addition, when the heat generated in the polygon chamber 10 is transmitted to the outside thereof, for the situations wherein the optical housing itself for positioning and fixing the various members in the optical housing deforms or the heat remains in the optical housing and thus generates a temperature gradient, for instance, if the image-forming means (the scanning lens) is made of plastic, because the expansion of the scanning lens is not uniform, the beam spot diameter of the photoreceptor becomes abnormal and the beam spot position varies with the lapse of time. Such an abnormality in the beam spot diameter and the change in the beam spot position are the major causes of the occurrence of picture abnormality such as the so-called "color shift" in the final printing to form color pictures or density irregularities of monochromic pictures.

To solve the problem posed by the temperature rise, the following technologies for lowering the temperature have been disclosed. For instance, in Japanese Application Publication Number Hei10-123447, a heat-radiating element was installed; in Japanese Application Publication Number 2002-214552, a cooling element was installed. Moreover, in Japanese Application Publication Number Hei10-221633, an air pressure was decompressed in a sealed polygon chamber and in Japanese Utility-Model Application Publication Number S 62-104218, a heat-generating part was joined to the cap with a heat pipe for radiating heat.

However, since these inventions enlarge the optical housing and make the light-scanning device complex, which is related to the increase in the dimensions and cost of the entire image-forming apparatus, the marketability of the image-forming apparatus is undermined notably.

Meanwhile, Japanese Application Publication Number 2002-267990 discloses in order to provide a polygon scanner motor which is capable of abating the wind noise to obtain low noise. The element characterized in this literature is that, instead of sealing the optical housing, a circular washer for abating the wind noise is fitted above (or above and below) the rotatable polygon mirror. A downward (and an upward) airstream generated by the rotation of the rotatable polygon mirror is obstructed by the circular washer and never directly hits the rotatable polygon mirror. Thus, the problems caused by the temperature rise in the polygon chamber are solved.

However, since the circular washer rotates together with the rotatable polygon mirror at high speed, it is very time-consuming to balance the polygon scanner as the body of rotation after the assembly of the polygon scanner, which may lead to a cost increase consequently. The polygon scanner is also prone to the balance disruption with the lapse of time. When the balance disruption with the lapse of time occurs, it is necessary to replace the polygon scanner or the light-scanning device, which is not in keeping with the common practice of resource saving.

SUMMARY OF TH INVENTION

An object of the present invention is to provide a small-sized and inexpensive light-scanning device which can be assembled easily and an image-forming apparatus equipped with the aforementioned light-scanning device while preventing the problem of heat generated from sealing the polygon chamber by opening up the polygon chamber for the realization of wind noise abatement and the contamination alleviation of the rotatable polygon mirror.

In order to achieve the above object, the inventors of the present application paid attention to the pressure distribution in the vicinity of the polyhedron-shaped rotatable polygon mirror rotating at high speed caused by the flow of the airstream generated by the angle of the adjoining portion of the adjacent reflecting surfaces of the mirror. The decrease of the generation of the wind noise and the contamination of the rotatable polygon mirror is achieved by making this pressure distribution more homogeneous than before and the assembly and the balance of the polygon scanner has been brought into consideration as well.

A light-scanning device according to one embodiment of the present invention includes a polygon scanner including a rotatable polygon mirror which defects a laser beam emitted from a light source; an optical image-forming element which images the deflected laser beam to a predetermined position; and an optical housing which supports the light source, the polygon scanner and the optical image-forming element. A non-rotational cylindrical shielding member is provided to cover an upper part of the polygon scanner.

DETAILED DESCRIPTION OF THE PREFERRED EMBODIMENTS

Preferred embodiments of the present invention will be described in detail below with reference to the accompanying drawings.

Figure 9:
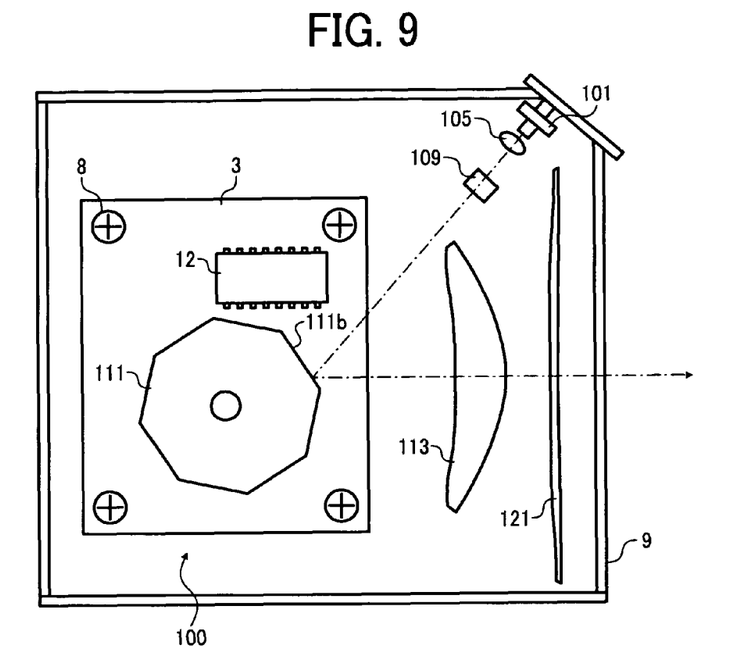
FIG. 9 is a plan view showing a schematic configuration of a conventional light-scanning device.
Figure 11:
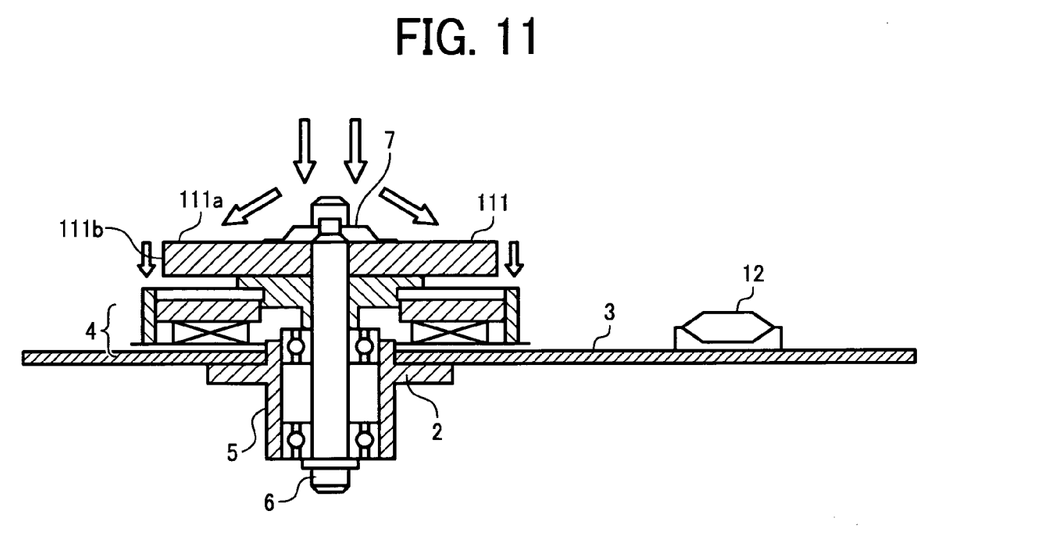
FIG. 11 is a sectional view for showing problems of the conventional light-scanning device.

The same reference numbers are attached to similar parts to those in the conventional light-scanning device, as shown in FIGS. 9 to 11. Therefore, a description regarding the same parts as in the conventional light-scanning device is applied to the following embodiments.

Embodiment 1

Figure 1A:
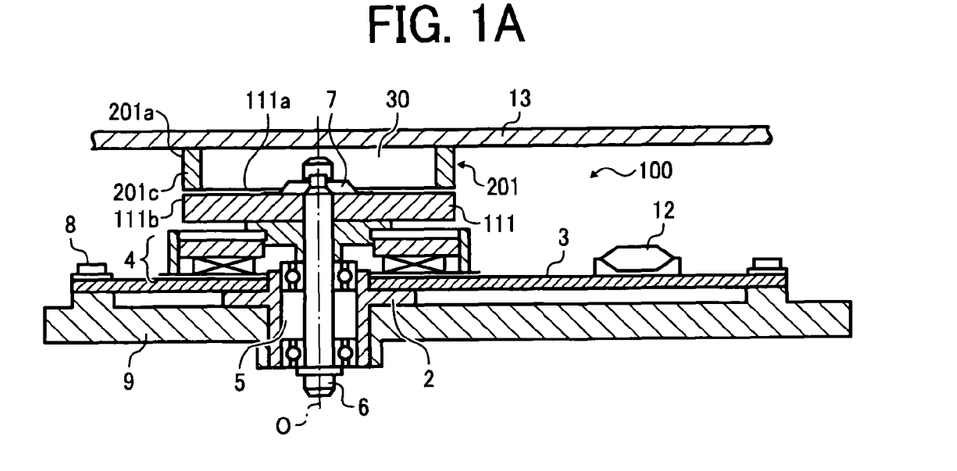
FIG. 1A is a sectional view showing main parts of a light-scanning device according to a first embodiment of the present invention.
Figure 1B:
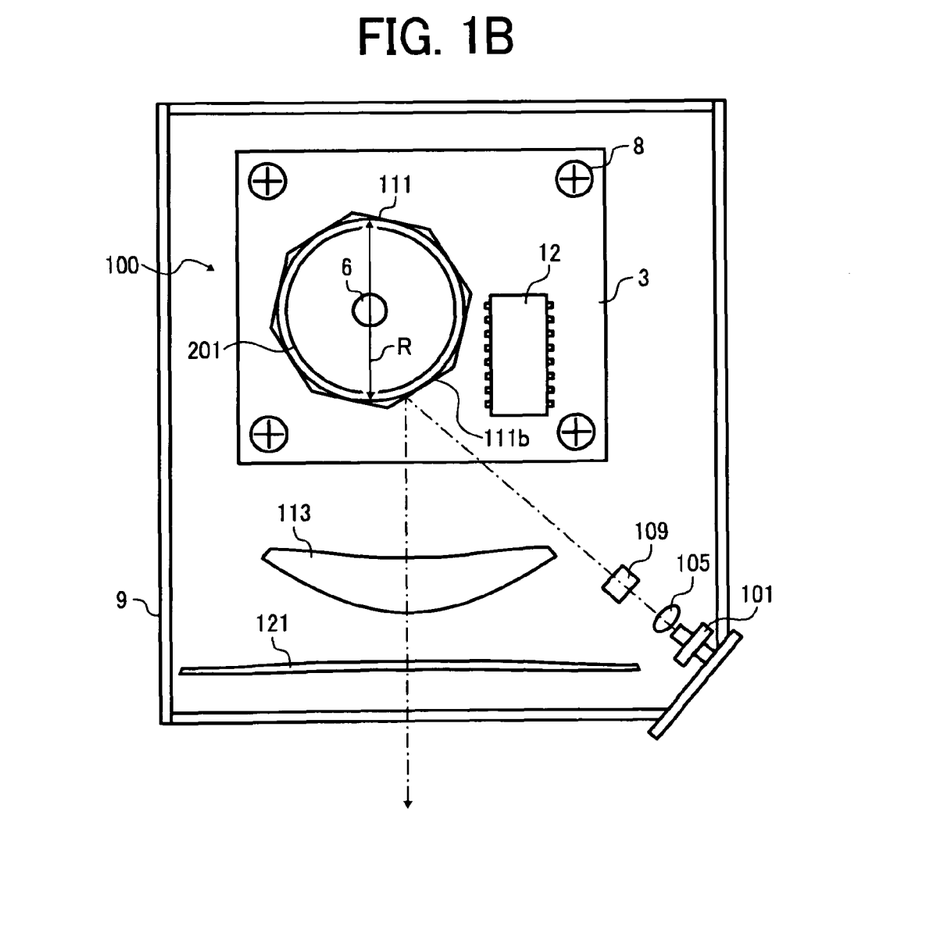
FIG. 1B is a plan view showing a schematic structure of a polygon scanner of the light-scanning device.

FIGS. 1A and 1B illustrate a first embodiment of a light-scanning device according to the present invention. The light-scanning device includes a polygon scanner 100. As is shown in FIG. 1A, the polygon scanner 100 is composed of a rotatable polygon mirror 111, a motor 4 to rotate the polygon mirror 111 and a driving control circuit board 3. The motor 4 is supported by a motor bearing 5. A bearing accommodation section 2 housing the motor bearing 5 is integrated with the driving control circuit board 3 by caulking and the like. The rotatable polygon mirror 111 is fixed at a rotation shaft 6 by a fixation spring 7. The rotatable polygon mirror 111 is rotated by the rotational drive of the rotation shaft 6. An integrated circuit 12 is installed on the driving control circuit board 3.

As for such a polygon scanner, the position is determined and fixed by a plurality of srews 8 in an optical housing 9. The optical housing 9 is usually made of a resin. An opening 9a is formed at the upper part of the optical housing 9 and is covered by a cover 13 made of a thin plate, synthetic-resin, etc. A gasket not shown in the figure to seal the inside of the optical housing 9 might be sandwiched between the optical housing 9 and the cover 13.

There is provided a non-rotational shielding member 201 to cover an upper part of the polygon scanner 100. To cover the upper part of the polygon scanner, the shielding member 201 is installed at the cover 13 of the optical housing 9. The shielding member 201 can be either integrally molded with the cover 13 or attached to the cover 13 as a separate body as shown in FIG. 1.

This shielding member 201 shown in FIG. 1B has, for example, a cylinder-shape. So as not to cover optical reflecting surfaces 111b of the rotatable polygon mirror 111, the cylindrical surface of the shielding member 201 is arranged above the rotatable polygon mirror 111 so that the shielding member 201 should not shut out the laser light. And, the shielding member 201 and the rotatable polygon mirror 111 are arranged to be concentric so that their respective centers, indicated by sign "O", are virtually on the same line. The outside diameter R of the cylinder-shaped shielding member 201 is set no smaller than the diameter of the inscribed circle of the rotatable polygon mirror 111 as its minimum. Namely, compared with the arranged location of the inscribed circle of the rotatable polygon mirror 111, an outer circumferential surface 201a of the shielding member 201 is further externally located.

With such a configuration, when the motor 4 is driven and the rotatable polygon mirror starts rotating at high speed, the airflow in the vicinity of the optical reflecting surfaces 111b of the rotatable polygon mirror becomes more uniform than before due to the existence of the cylinder-shaped shielding member 201. Namely, as shown in FIG. 11, because the downward airstream is obstructed by the shielding member 201, the influx of air to the vicinity of the rotatable polygon mirror 111 is reduced, which results in the wind noise abatement and the alleviation of the contamination on the optical reflecting surfaces 111b of the rotatable polygon mirror 111.

Since the shielding member 201 is fixed to the cover 13 and does not rotate even if the rotatable polygon mirror 111 is rotated, the dimensional precision is not required as in conventional cases. Furthermore, since on the one hand, the assembly of the polygon scanner and the approach to achieving balancing are unalterably performed and on the other hand, the rotating body is only the rotatable polygon mirror 111, the occurrence of balance disruption with the lapse of time becomes infrequent.

Embodiment 2

Figure 2:
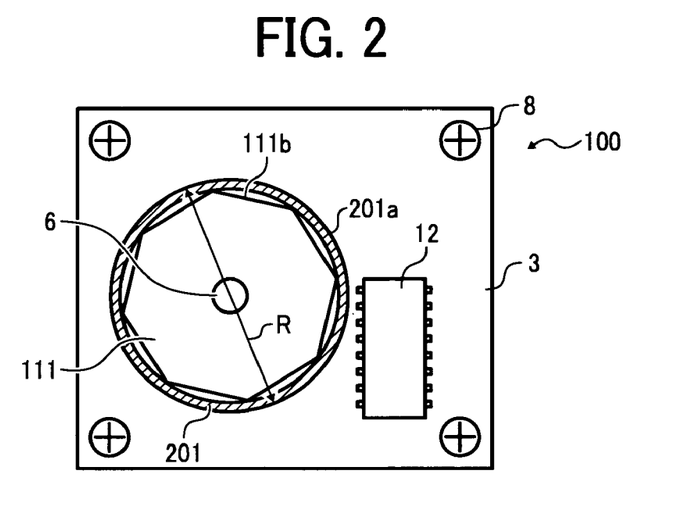
FIG. 2 is a plan view showing a schematic structure of a polygon scanner of a light-scanning device according to a second embodiment of the present invention.
Figure 3:
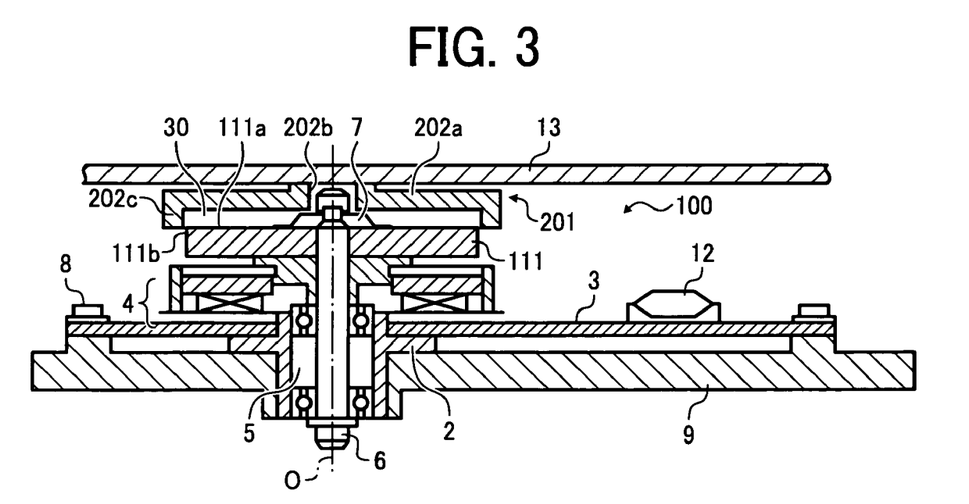
FIG. 3 is a plan view showing a schematic structure of a polygon scanner of the light-scanning device according to a third embodiment of the present invention.

In this embodiment, as illustrated in FIG. 2 and FIG. 3, for comparison with the first embodiment, an outside diameter (diameter) R of the cylinder-shaped shielding member 201 is set no smaller than a diameter of the circumscribed circle of the rotatable polygon mirror 111 as its minimum. Other configurations are the same as those in the first embodiment. Namely, compared with the arranged location of the circumscribed circle of the rotatable polygon mirror 111, an outer circumferential surface 201a of the shielding member 201 is further externally located.

Although it was described in the first embodiment that the wind noise abated and the contamination on the optical reflecting surfaces 111b of the rotatable polygon mirror 111 could be alleviated because of the effect produced by the shielding member 201 in which the airflow in the vicinity of the optical reflecting surfaces 111b of the rotatable polygon mirror 111 was able to become more uniform than ever before, if the outside diameter R of the cylindrical shielding member 201 is set larger than the circumscribed circle diameter of the rotatable polygon mirror 111, the airflow in the vicinity of the optical reflecting surfaces 111b of the rotatable polygon mirror 111 can be further made more uniform than ever before. In addition, the wind noise can be further abated and the contamination on the optical reflecting surfaces 111b of the rotatable polygon mirror 111 can be further alleviated.

Embodiment 3

In the first and second embodiments, since the shape of the shielding member 201 is a non-complex cylindrical shape, it has the advantage of simplifying production. In contrast, however, because the fixation spring 7 and etc. are located on the upper surface 111a which is perpendicular to the optical reflecting surfaces 111b of the rotatable polygon mirror 111, an interspace is generated between the upper surface 111a which is perpendicular to the optical reflecting surfaces 111b of the rotatable polygon mirror 111 and the cover 13 of the optical housing. In such a state, when the rotatable polygon mirror 111 rotates at high speed, due to the centrifugal force, the air in a space 30 above the rotatable polygon mirror 111 is expelled from the interspace between the rotatable polygon mirror 111 and the shielding member 201. Consequently, the pressure of this space is reduced and become negative. Due to the negative pressure, the rotatable polygon mirror 111 or the rotating parts (the rotatable polygon mirror 111, the rotation shaft 6, the fixation spring 7) become more easily lifted, which results in the more frequent occurrence of the rotating balance disruption and the deterioration in the rotation precision. In the worst case, it may even become possible for the rotation to be stopped either because the rotatable polygon mirror 111 comes in contact with the shielding member 201 or because the upper part of the rotation shaft 6 comes in contact with the cover 13 of the optical housing. Namely, it is necessary to diminish the space volume (capacity) between the upper surface 111a which is perpendicular to the optical reflecting surfaces 111b of the rotatable polygon mirror 111 and the optical housing cover 13.

Therefore, in this embodiment, in order to reduce the space volume (capacity) 30, as illustrated in FIG. 3, a shielding member 202 in the shape of a covered cylinder is formed so as not to come in contact with the fixed spring 7 above the rotation shaft 6. Since a hole 202b wherein the upper part of the rotation shaft 6 can be loosely inserted is formed in a ceiling surface 202a of the shielding member 202, 202 does not resist the rotation of the rotation shaft 6 and the ceiling surface 202a can be made to approach the upper surface 111a of the rotatable polygon mirror 111 to the maximum extent. Other configurations are the same as those in the second embodiment.

By such a configuration, because the wind noise abatement, the alleviation of the contamination on the optical reflecting surfaces 111b and the alleviation of the negative pressure can be achieved, the lift of the rotatable polygon mirror 111 and the rotating parts (the rotatable polygon mirror 111, the rotation shaft 6, the fixation spring 7) becomes preventable. Meanwhile, the rotating balance disruption and the deterioration of the rotating precision can be restrained.

Embodiment 4

Figure 4A:
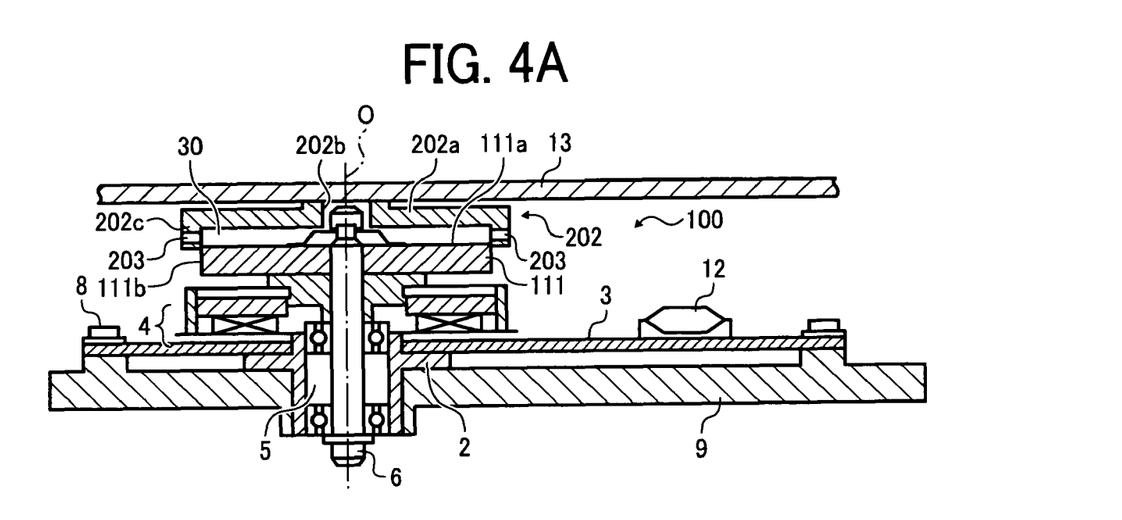
FIG. 4A is a sectional view showing main parts of a light-scanning device according to a fourth embodiment of the present invention.

In the third embodiment, the space volume (capacity) 30 between the upper surface 111a which is perpendicular to the optical reflecting surfaces 111b of the rotatable polygon mirror 111 and the optical housing cover 13 is diminished and the method of reducing the negative pressure of that space has been explained; however, in this embodiment, the configuration for reducing the negative pressure will be further explained. As shown in FIG. 4(a), a minute communicating hole 203 is disposed penetrating a cylindrical sidewall 202c of the shielding member 202 in the direction of the diameter of the sidewall to communicate the space 30 with its external space so as to diminish the pressure difference in between. In an attempt to diminish such a pressure difference, the hole should be minute because if the diameter of the communicating hole 203 is enlarged, the flow of the air current changes accordingly, which makes it difficult for the pressure distribution in the vicinity of the rotatable polygon mirror 111 to be constant.

Figure 4B:
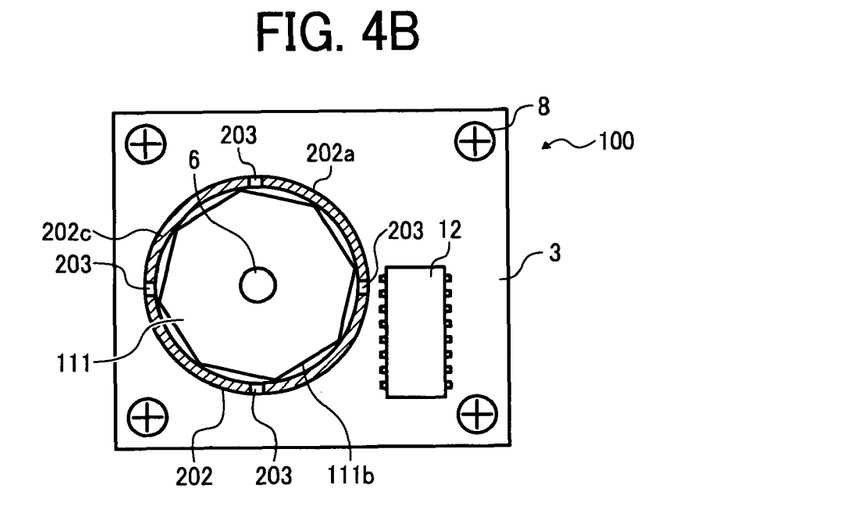
FIG. 4B is a plan view showing a schematic structure of a polygon scanner of the light-scanning device.

The existence of two or more minute communicating holes becomes necessary. For instance, when there exists only one communicating hole, since the outflow of the air from the space 30 is concentrated in one place, the pressure balance deteriorates in the space 30, which causes the problems as explained in the first half part of the third embodiment. Furthermore, even if there are arranged two or more communicating holes 203, if their positions are deviated, the same problems will arise as those when there exists only one hole. Therefore, it is preferable to arrange the communicating holes 203 in mutually symmetrical positions, namely, to align them so as to pass through the center of the shielding member 202. An arrangement example is illustrated in FIG. 4B wherein four minute communicating holes are arranged. By disposing the minute communicating holes 203 symmetrically, the pressure in the space 30 is maintained in a balanced state and the pressure in the space 30 can be prevented from being excessively lowered (the pressure becoming negative). Meanwhile, although the present embodiment has been illustrated wherein there exist four minute communicating holes 203, provided that the pressure in the space 30 can be maintained in a balanced state, the number of communicating holes need not necessarily be four.

Figure 5:
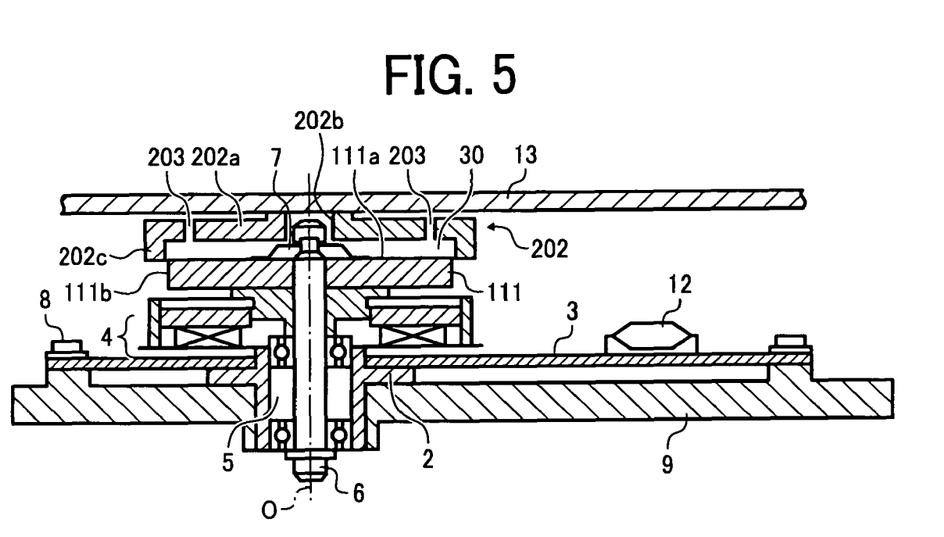
FIG. 5 is a sectional view showing main parts of a transfiguration according to a fourth embodiment of the invention.

In the present embodiment, although the communicating holes 203 are formed in the cylindrical sidewall 202c of the shielding member 202, the positions thereof are not limited thereto. For instance, as illustrated in FIG. 5, the communicating holes can also be formed in the ceiling surface 202a of the shielding member 202. Likewise, in this situation, it is desirable to dispose a plurality of the minute communicating holes 203 in mutually symmetrical positions. Meanwhile, because the purpose of the present embodiment is to reduce the negative pressure, the minute communicating holes 203 can be arranged in both the cylindrical sidewall 202c and the ceiling surface 202a. In addition, the minute communicating holes 208 are not necessarily arranged only in the shielding member 202. For instance, they can be arranged in the cylindrical sidewall 201c of the shielding member 201 as well.

Embodiment 5

Figure 6A:
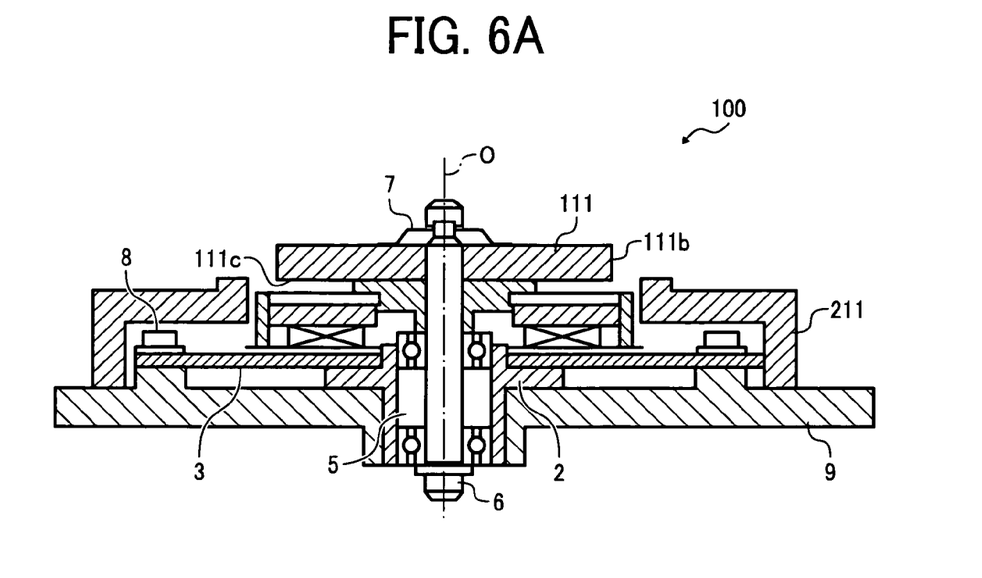
FIG. 6A is a sectional view showing main parts of a light-scanning device according to a fifth embodiment of the invention.
Figure 6B:
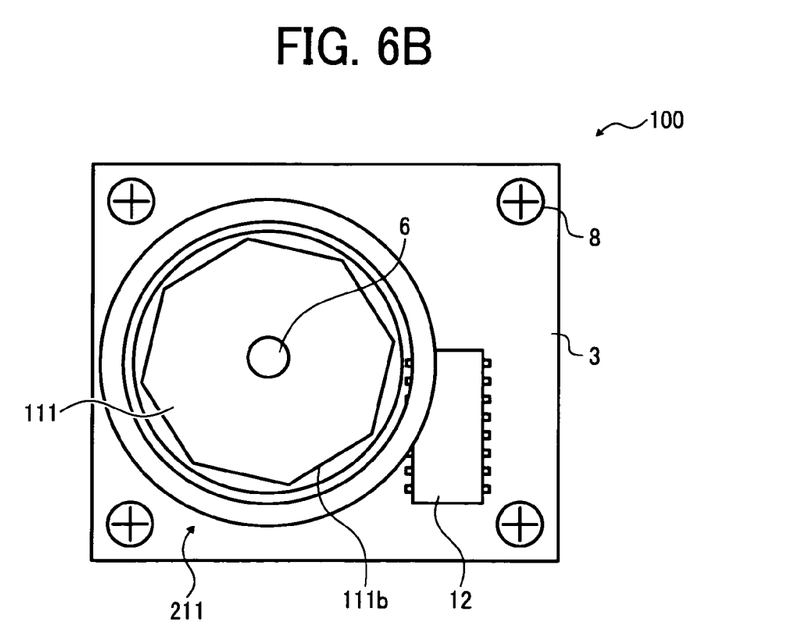
FIG. 6B is a plan view showing a schematic configuration of a polygon scanner of the light-scanning device.

The shielding member 211 is provided in the optical housing 9, which is below the rotatable polygon mirror 111. The shielding member 211 can be either integrally molded with the optical housing 9 or attached to the optical housing 9 as a separate body as shown in FIG. 6.

Even if the shielding member 211 is arranged in the optical housing 9, like the shielding member 201, it is disposed so as not to cover the optical reflecting surfaces 111b of the rotatable polygon mirror 111. The centre of the cylindrical 211 and the rotating centre of the rotatable polygon mirror 111 are set to be concentric so that the two centers are virtually on the same line.

With such a configuration, the airflow in the vicinity of the optical reflecting surfaces 111b of the rotatable polygon mirror 111 becomes more uniform than ever before due to the existence of the cylinder-shaped shielding member 211. As a result, the pressure distribution becomes constant induced by the upward airstream in the vicinity of the rotatable polygon minor; the wind noise is abated and furthermore, the contamination on the optical reflecting surfaces 111b of the rotatable polygon mirror can be alleviated.

Since the shielding member 211 is fixed to the optical housing, it does not rotate even if the rotatable polygon mirror 111 is rotated. Thus, dimensional precision is not required as in conventional cases. Furthermore, since on the one hand, the assembly of the polygon scanner and the approach to achieving balancing are unalterably performed and on the other hand, the rotating body is only the rotatable polygon mirror 111, the occurrence of balance disruption with the lapse of time becomes infrequent.

Further, even if the outside diameter of the cylindrical shielding member 211 is set larger than either the inscribed circle diameter of the rotatable polygon mirror 111 or the circumscribed circle diameter of the rotatable polygon mirror 111, the same effects can be obtained as from the above-described embodiments.

Embodiment 6

Figure 7:
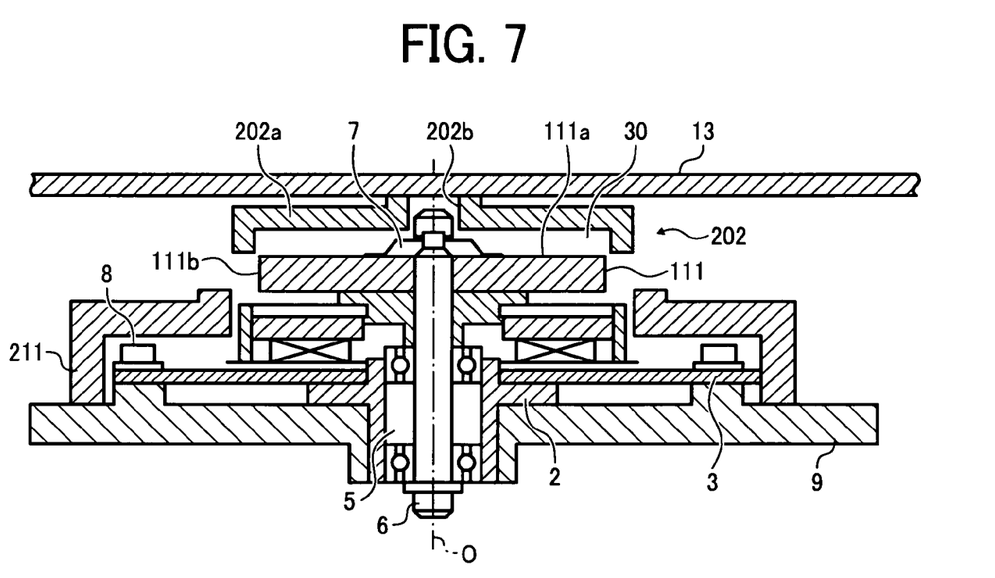
FIG. 7 is a plan view showing a schematic configuration of a polygon scanner of light-scanning device according to a sixth embodiment of the invention.

In the present embodiment, as is illustrated in FIG. 7, the shielding members 202 and 203 are arranged at the cover 13 and the optical housing 9 respectively as countermeasures against the downward and the upward airstream. In FIG. 7, although the shielding member 202 is arranged at the cover 13, instead, the shielding member 201 can also be arranged there.

With such a configuration, by covering all the parts except for the optical reflecting surfaces 111b of the rotatable polygon mirror 111 by the shielding member 202 and 211, the airflow in the vicinity of the optical reflecting surfaces 111b of the rotatable polygon mirror 111 becomes more uniform than ever before due to the existence of the cylinder-shaped shielding member 201 and 211. Therefore, the influx of air to the vicinity of the rotatable polygon mirror 111 is reduced; the wind noise is abated and furthermore, the contamination of the optical reflecting surfaces 111b of the rotatable polygon mirror 111 can be alleviated. In addition, since the shielding member 201 is fixed to the cover 13 and the shielding member 211 is fixed to the optical housing 9 respectively, they do not rotate even if the rotatable polygon mirror 111 rotated. Thus, dimensional precision is not required as in conventional cases. Furthermore, since on the one hand, the assembly of the polygon scanner and the approach to achieving balancing are unalterably performed and on the other hand, the rotating body is only the rotatable polygon mirror 111, the occurrence of the balance disruption with the lapse of time becomes infrequent.

Embodiment 7

Figure 8:
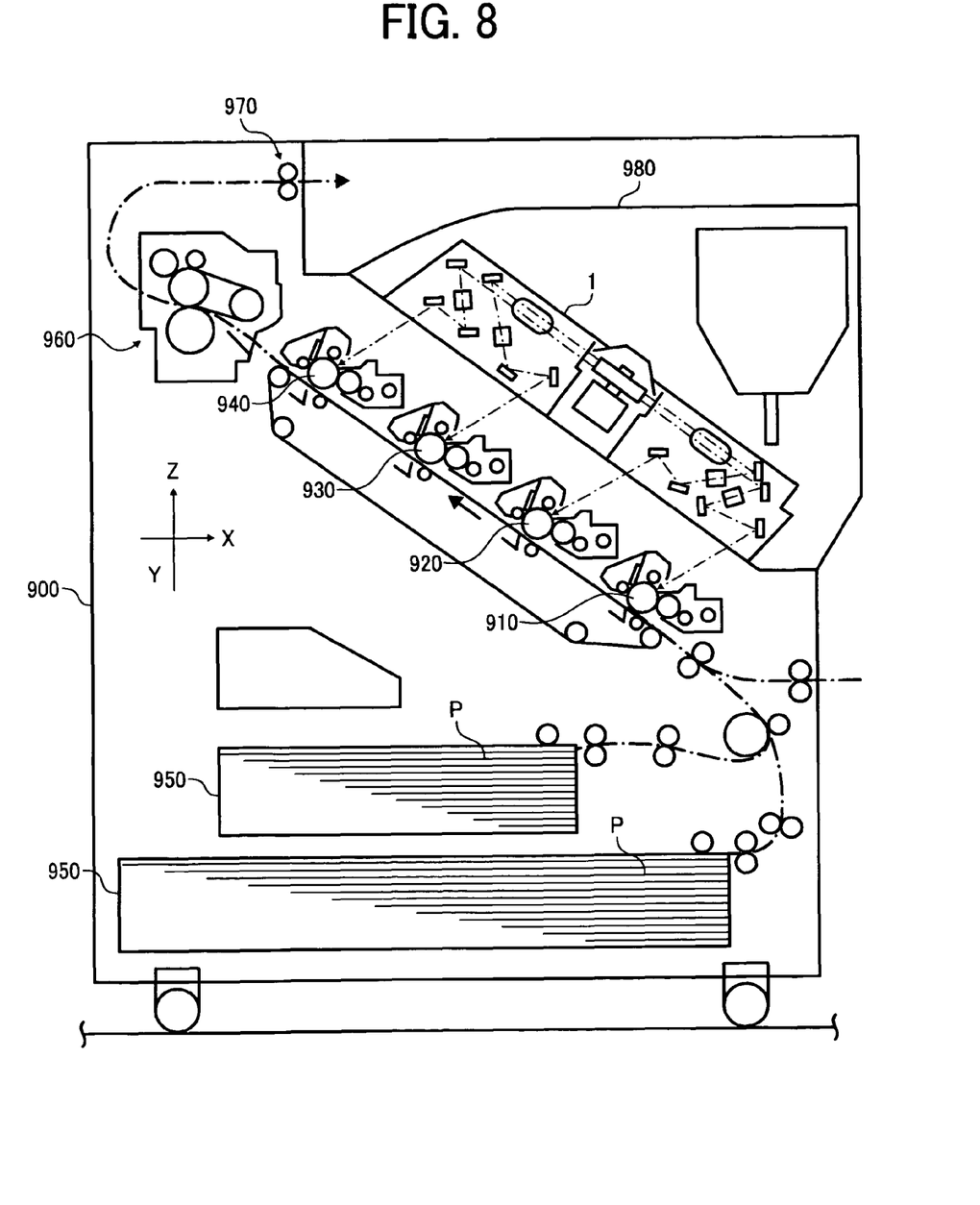
FIG. 8 shows a schematic configuration of an image-forming apparatus having the light-scanning device of the invention.

The present embodiment is related to the configuration of an image-forming apparatus equipped with the aforementioned light-scanning device 1. In FIG. 8, a color image-forming apparatus of a tandem system is shown as an example in which the light-scanning device 1 is incorporated. In the light-scanning device 1, the wind noise is abated and the contamination of the rotatable polygon mirror is alleviated. In FIG. 8, symbol 1 represents the light-scanning device described heretofore. The light-scanning device 1 is attachable to and detachable from the image-forming apparatus. Meanwhile, not only can the light-scanning device be incorporated in an image-forming apparatus of a tandem system forming color images, but also it can be incorporated in the monochromic image-forming apparatus in the present invention.

As shown in FIG. 8, the light-scanning device 1 is set obliquely in a main body of an image-forming apparatus 900. A processing cartridge having four photoreceptor drums 910, 920, 930 and 940 functioning as the image carriers is arranged so as to incline in parallel with the light-scanning device 1 at a lower position. The photoreceptor drums 910, 920, 930 and 940 serving to form images in the color of yellow (Y), cyan (S), magenta (M) and black (Bk) are scanned by the laser light emitted from the light-scanning device 1 and modulated by image signals corresponding to the respective colors, and thereby form electrostatic latent images corresponding to the respective colors on the surface of the respective photoreceptor drums. In the vicinity of each photoreceptor drum, in order to execute an electrophotographic process, a commonly known charging device, exposure device, developing device, transferring device and cleaning device are arranged. In addition, a fixing device 960 is also arranged to fix the toner image formed on transfer paper P. The light-scanning device 1 functions as an exposure device and forms the latent images corresponding to the respective colors on the surfaces of the respective photoreceptor drums by scanning the respective uniformly electrified surfaces of the photoreceptor drums with light. These latent images are developed by the toners of the corresponding colors with the use of a developing device.

A cassette 950 for storing the transfer paper P in a stacked state is positioned at the lower part of the main body of the image-forming apparatus 900. The transfer paper P, which is pulled out of the cassette 950 sheet by sheet, is aligned with the toner images formed on the surfaces of the respective photoreceptor drums and conveyed, thereby the toner images in the respective colors are overlappingly transferred onto the transfer paper P with the use of the transferring device to form color images. The color images on the transfer paper P are fixed by the fixing device 960 and ejected from a paper ejecting tray 980, which is on the upper part of the image-forming apparatus 900, by a paper ejecting roller 970. By adopting any one of the light-scanning devices explained in the first to the fifth embodiments as a color image-forming device illustrated in FIG. 8, because the wind noise of the image-forming device in operation is abated and the contamination on the rotatable polygon mirror can be alleviated, the occurrence of the remarkable decrease in the reflectivity, the reduction in light quantity and the irregularity of the light quantity can be suppressed. Thus a good image becomes obtainable.

Although the present invention has been described in terms of exemplary embodiments, it is not limited thereto. It should be appreciated that various changes and modifications can be made to the embodiments by persons skilled in the art without departing from the scope of the present invention as defined by the following claims.

What is claimed is:

1. A light-scanning device comprising:
   a polygon scanner including a rotatable polygon mirror which deflects a laser beam emitted from a light source;
   an optical image-forming element which images the deflected laser beam on a predetermined position of an image carrier;
   an optical housing which supports the light source, the polygon scanner and the optical image-forming element;
   a cover disposed above the polygon mirror and configured to seal an opening of the optical housing; and
   a cylinder-shaped non-rotational shielding member disposed between the cover and the polygon mirror and attached to the cover so as to cover an upper part of the polygon mirror,
   wherein the non-rotational shielding member has an outer circumferential surface and is disposed on a circle that is concentric with a rotation center of the rotatable polygon mirror,
   wherein the non-rotational shielding member is disposed to surround an air space that is located between the polygon mirror and the shielding member, and
   wherein an outside diameter of the outer circumferential surface of the non-rotational shielding member is set to be larger than at least an inscribed circle of the rotatable polygon mirror.

2. The light-scanning device according to claim 1, wherein the shielding member is disposed so as not to cover optical reflecting surfaces of the rotatable polygon mirror.

3. The light-scanning device according to claim 1, wherein an outside diameter of the cylindrical shielding member is larger than a diameter of an inscribed circle of the rotatable polygon mirror.

4. An image-forming apparatus comprising: an image carrier; and the light-scanning device wherein the laser beam emitted from the light source is deflected by the rotatable polygon mirror and the deflected laser beam is imaged by the optical image-forming element on a predetermined position of the image carrier, wherein the light-scanning device is the one according to claim 1.

* * * * *